Dec. 25, 1934.   O. U. ZERK   1,985,709
SHACKLE MECHANISM
Filed Aug. 2, 1932
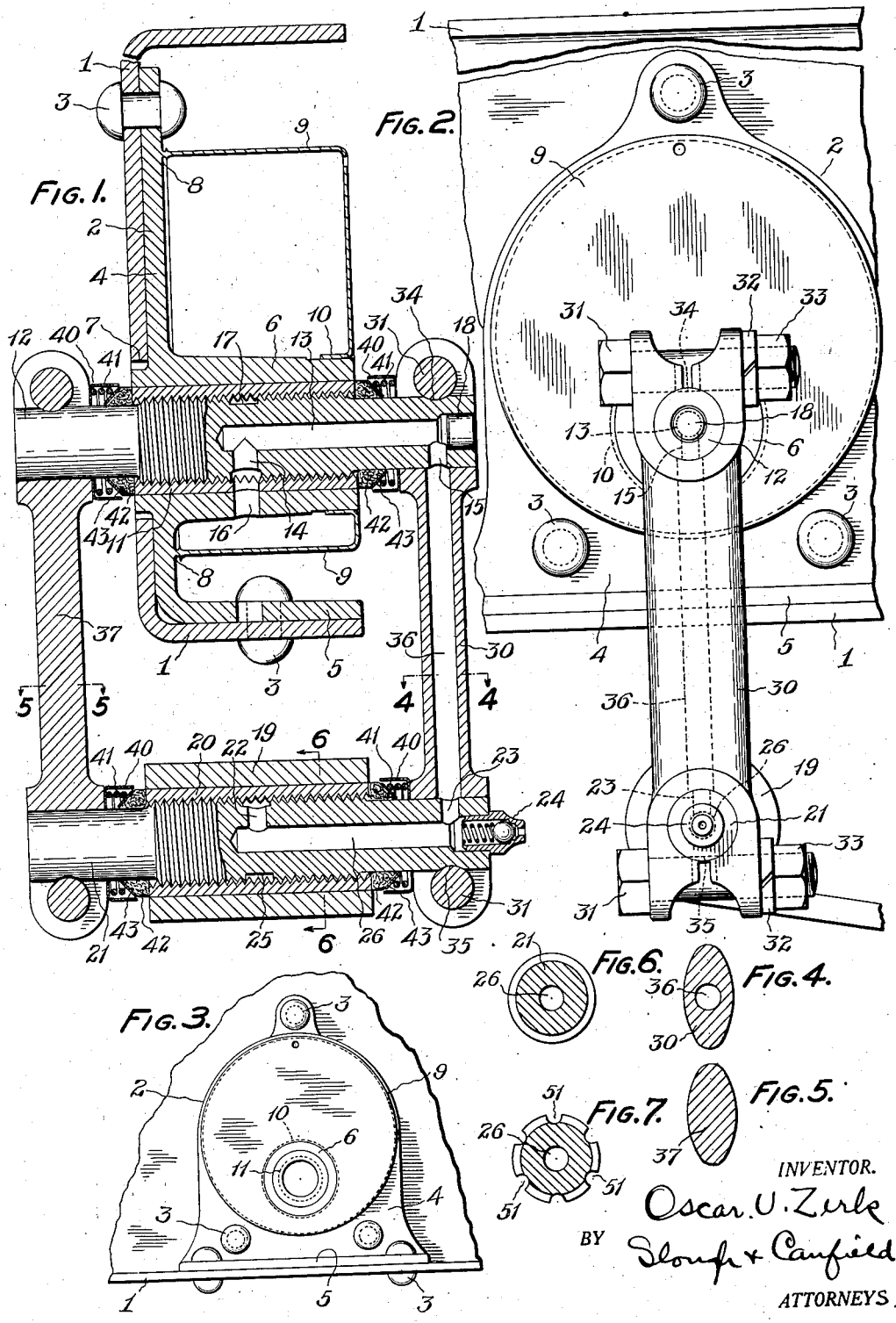
INVENTOR.
Oscar U. Zerk
BY Slough & Canfield
ATTORNEYS.

Patented Dec. 25, 1934

1,985,709

UNITED STATES PATENT OFFICE 1,985,709

SHACKLE MECHANISM

Oscar U. Zerk, Chicago, Ill.

Application August 2, 1932, Serial No. 627,264

12 Claims. (Cl. 267—54)

This invention relates to shackle mechanisms for connecting the body of a vehicle with the springs or other suspension means therefor.

Heretofore, shackle mechanisms have been provided with various types of lubricating means, the lubricating means being periodically resupplied with lubricant after each operation of the vehicle for predetermined mileage such as 500 or 1000 miles. This was necessary inasmuch as the lubricant would continuously seep from the shackle mechanism during operation of the vehicle. Such periodic rechargings of the lubricant entailed inconvenience and relatively great expense.

It is an object of my invention to provide an improved shackle bearing mechanism for vehicles or the like.

It is another object of my invention to provide a shackle bearing mechanism for vehicles and the like, having improved means for effectively sealing the bearing portion thereof against the ingress of foreign abrasive substances thereto.

Another object is to provide a shackle mechanism for vehicles and the like having improved means to retain in the bearing portion thereof an initial supply of bearing lubricant.

Another object is to provide a shackle bearing mechanism having means for retaining initially applied lubricant in the bearing portion of the mechanism throughout the life of the mechanism or of the vehicle upon which it is employed.

Another object is to provide an improved shackle mechanism for vehicles and the like which is susceptible of manufacture by relatively inexpensive screw-machine and stamping operations.

Another object is to provide an improved shackle mechanism for vehicles and the like which may be easily and efficiently assembled.

Another object is to provide a shackle mechanism for vehicles and the like wherein lateral movement due to side sway or the like of the vehicle is relatively restrained in an improved manner.

These and other objects of the invention will become increasingly apparent from a consideration of the accompanying description and drawing wherein like parts are referred to by like reference characters, wherein:

Fig. 1 is a vertical medial sectional view of a preferred embodiment of my invention;

Fig. 2 is a fragmentary elevational view of the embodiment illustrated in Fig. 1;

Fig. 3 is a fragmentary elevational view showing a lubricant casing which I may employ in association with the shackle;

Fig. 4 is a transverse sectional view taken along the lines 4—4 of Fig. 1;

Fig. 5 is a transverse sectional view taken along the lines 5—5 of Fig. 1;

Fig. 6 is a transverse sectional view taken along the lines 6—6 of Fig. 1 illustrating a preferred form of shackle bolt;

Fig. 7 is a transverse sectional view showing a modified form of shackle bolt which I may employ.

Referring to the drawing, I have indicated at 1 a conventional sill or frame of a vehicle of channel-shape and adapted to support a hanger generally indicated at 2 in any suitable manner such as by rivets 3.

The hanger 2 comprises a generally vertical plate 4 having an integral and laterally extending foot 5, the plate 4 being riveted to the web of the channel and the foot 5 to the channel flange. The plate 4 has integral therewith a hub 6, the plate 4 being apertured as indicated at 7 to accommodate an inwardly extending relatively reduced portion of the hub. Eccentric of the hub 6 and encircling the same, the plate 4 is provided with a circular raised portion as indicated at 8 to which is secured a relatively thin, preferably sheet metal, casing 9 by any suitable means such as welding. The casing 9 is provided with an inwardly disposed circular shoulder 10 adapted to sealingly engage a faced portion of the hub 6 thereby providing a completely sealed casing encircling the hub 6 and supported by the plate 4.

The hub 6 has rigidly secured therein, preferably by press-fitting, an internally threaded bushing 11, the bushing being of preferably the same length as the hub, and threadedly engaging the bushing 11 is an upper shackle bolt 12. The shackle bolt 12 comprises a centrally threaded portion and cylindrical ends substantially the root diameter of the threads, the threads of which portion terminate slightly inwardly of the bushing ends whereby as the shackle bolt 12 is turned relative to the bushing, the threaded portion will always be disposed slightly inwardly of the bushing.

The bolt 12 is provided with a coaxial duct running from the outwardly disposed bolt end to substantially the mid-portion of the bolt as indicated at 13, radially disposed ducts 14 and 15 being disposed at substantially the center of the bolt and adjacent the outer ends respectively and connecting with the duct 13. The radial duct 14 is adapted to align with a duct 16 provided in the hub 6 whereby lubricant which may be disposed in the casing will be fed through duct 14, duct 13, and to the outwardly disposed radial duct 15.

As indicated at 17, the bolt 12 is recessed circumferentially whereby lubricant in duct 16 may be communicated through the groove 17 to the relatively movable interengaging threaded surfaces of the bushing 11 and bolt 12 to lubricate the same. The duct 13 is preferably enlarged at the outer end whereby a plug 18 may be sealingly inserted therein.

A spring eye 19, generally tubular in form, has preferably press-fitted therein an internally threaded bushing 20, the bushing threadedly engaging a lower shackle bolt 21 generally similar to the upper shackle 12 previously described, and being provided with a coaxial duct 26 and communicating radially disposed ducts 22 and 23 at substantially the central and outer portions of the bolt respectively.

The outwardly disposed end of the duct 26 is preferably enlarged whereby a lubricating nipple 24 may be inserted to supply lubricant and sealingly retain the same in a manner well understood. The lower shackle bolt 21 is provided with a circumferentially extending recess 25 for lubricating the threads of the bushing 20 and bolt 21 as previously described in connection with the upper shackle bolt.

An outwardly disposed shackle link 30 is provided with enlarged jaws adapted to encircle the end portions of the upper and lower shackle bolts and tightly engage the same by means of bolt 31, lock washer 32 and nut 33 adapted to draw the jaws together and thereby rigidly secure the links to the shackle bolts. The shackle bolts are preferably provided with transversely extending grooves as indicated at 34 and 35 whereby the shackle bolts will be non-rotatably locked with the shackle links.

The shackle link 30 has extending therethrough a vertical duct 36, this being more clearly illustrated in Fig. 4, adapted to align the duct 15 in the upper shackle bolt 12 and duct 23 in the lower shackle bolt 21, thus permitting lubricant which is fed through the upper shackle bolt to the duct 15 to be communicated to the lower shackle bolt and through centrally disposed radial duct 22 to the circumferential groove 25 and thence to the relatively movable interengaging threaded surfaces of the lower shackle bolt and the bushing 20.

An inwardly disposed shackle link 37 is secured in a like manner to the opposite ends of the upper and lower shackle bolts and is generally similar to the outwardly disposed shackle link 30 with the exception that no duct is provided therein as is most clearly illustrated by referring to Fig. 5, the upper and lower shackle bolts thus being maintained by the shackle links in rigid substantially parallel relation and relatively non-rotatable.

Encircling the bolt end portions and abutting the inner faces of the shackle link clamping jaws are preferably sheet metal cups 40 having disposed therein normally compressed springs 41, the springs pressing upon a preferably frusto-conical shaped sealing washer 42 composed of any suitable material. The sealing washer 42 encircles the shaft adjacent the termination of the threaded portion and abuts the end faces of the bushing, and due to its frusto-conical shape is maintained in sealing engagement with the said surfaces. I preferably employ a sheet metal frusto-conical ring 43 upon which the end convolutions of the spring may press in order that the spring pressure may be more uniformly distributed to the sealing ring. Thus, any lubricant contained intermediate the threads of the shackle bolts and the engaging threads of the bushing will be effectively retained therein; and the loss even over relatively long periods such as the life of the vehicle will be comparatively negligible ensuring that an initial charge of lubricant will last throughout the usual life of the shackle mechanism or the vehicle upon which employed.

As previously stated, the threads of the upper and lower shackle bolts terminate slightly inwardly of the bushing end faces in order that the sealing washer 42 will not engage the bolt threads as relative lateral movement occurs.

Due to road impacts and the like, a vertical movement of the shackle links will cause only a relatively slight lateral movement of the shackle bolt dependent upon the pitch of the thread and in this manner undesirable lateral play will be restrained.

Although I preferably employ the type of shackle bolt illustrated, I contemplate as illustrated in Fig. 7 that the bolt may be provided with longitudinally extending grooves 51 throughout the threaded portion, whereby the lubricant may be more effectively carried to the relatively movable surfaces of the shackle bolts and the enclosing bushing. These grooves are preferably slightly deeper than the root of the threads but preferably do not extend below the diameter of the cylindrical portions surrounded by the packing rings, nor extend longitudinally into these cylindrical portions. The grooves also function as settling or collecting chambers to collect particles of abrasive material which may wear off of the threads or foreign material which may in any manner find ingress thereto.

The nipple 24 being disposed on the outer shackle link, is easily accessible when it is desired to initially charge the casing and bearings with lubricant, and the lubricant penetrating through the relatively movable threaded portion of the upper and lower shackle bolts, will maintain the shackle in a properly lubricated condition; and due to the effect of the sealing means, a negligible amount of lubricant will be lost even over relatively long periods of use.

Although I have shown and described a preferred embodiment of my invention, it is understood that numerous and extensive departures may be made therefrom without departing from the spirit of my invention and the scope of the appended claims.

Having thus described my invention, what I claim is:

1. In a shackle mechanism, a hanger adapted to be rigidly secured to a vehicle frame having a laterally extending hub portion, a lubricant casing asociated with said hanger and communicating interiorly of the hub, a shackle bolt threadedly engaging the hub portion, a pair of shackle links constrictingly engaging the bolt outwardly of the hub, a second shackle bolt non-rotatably and rigidly supported by the shackle links in substantially parallel relation to the first said bolt, the second shackle bolt being adapted to threadedly engage a spring eye or the like, and communicating means comprising ducts provided in the first shackle bolt, one of said shackle links, and the second shackle bolt whereby lubricant in the casing may be distributed to both said bolt threaded portions, and sealing means intermediate the inner faces of the shackle links and the hanger and spring eye to effectively seal the hanger and spring eye against the escape of lubricant.

2. In a shackle mechanism adapted to secure a leaf spring to a vehicle frame, a hanger adapted to be rigidly secured to the vehicle frame and having a laterally extending hub portion, a shackle bolt having a central portion threadedly engaging the hub and relatively reduced end portions, a pair of shackle links clampingly and non-rotatably engaging the bolt end portions, a second shackle bolt clampingly secured by the links in substantially parallel relation to the first said bolt and adapted to threadedly engage a spring eye, each of said bolts being provided with a recessed circumferentially extending groove, a lubricant casing adapted to communicate with a duct provided in one of said shackle links whereby lubricant from the casing will be distributed to the bolt threaded portions, and a lubricant nipple in one of said bolts whereby lubricant may be provided for the casing.

3. In a shackle mechanism, a hanger adapted to be rigidly secured to a vehicle frame having a transversely extending hub portion, an internally threaded bushing rigidly secured within the hub, a shackle bolt threadedly engaging the bushing, shackle links spaced outwardly from the bushing constrictingly and non-rotatably engaging the bolt ends, spring-pressed sealing means intermediate the shackle links and the bushing adapted to seal the bushing ends and adjacent bolt surface, a second shackle bolt rigidly secured in substantially parallel relation with the first bolt by said shackle links and adapted to threadedly engage a spring eye, a lubricant chamber associated with said hanger, and means to communicate lubricant jointly to the external threaded portions of said bolts, at least one of said bolts being provided with a plurality of longitudinally extending grooves adapted to provide settling chambers for abrasive substances.

4. In a shackle mechanism connection between a vehicle frame and the eye of a spring, a pair of substantially parallel bolt elements having intermediate portions screw-threadedly rotatably connected respectively to the frame and the eye, a pair of link elements rigidly connected at opposite ends to corresponding ends of the bolt elements, a lubricant chamber on the frame, a lubricant duct therefrom to the intermediate threaded portion of the frame connected bolt, a duct extending axially of the bolt and longitudinally of a link and axially of the eye connected bolt to the intermediate threaded portion thereof, said bolt elements being threaded in bushings pressed respectively into the eye and into a bored element on the body, and the bolt elements provided with cylindrical end portions and annular sealing elements sealingly engaging the cylindrical portions and the bushing ends.

5. In a shackle mechanism connection between a vehicle frame and the eye of a spring, a pair of substantially parallel bolt elements having intermediate portions screw-threadedly rotatably connected respectively to the frame and the eye, a pair of link elements rigidly connected at opposite ends to corresponding ends of the bolt elements, a lubricant chamber on the frame, a lubricant duct therefrom to the intermediate threaded portion of the body connected bolt, a duct extending axially of the bolt and longitudinally of a link and axially of the eye connected bolt to the intermediate threaded portion thereof, said threaded bolt elements provided with longitudinal grooves in the threads thereof.

6. In a shackle mechanism connection between a vehicle frame and the eye of a spring, a pair of substantially parallel bolt elements having intermediate portions screw-threadedly rotatably connected respectively to the frame and to the eye, a pair of link elements rigidly connected at opposite ends to corresponding end portions of the bolt elements, a lubricant duct communicating with the threaded portion of one bolt, extending axially through the bolt and longitudinally of a link, and axially of the other bolt, and communicating with the threaded portion thereof, means for introducing lubricant into the duct, said bolt elements being threaded in bushings pressed respectively into the eye and into a bored element on the body, and the bolt elements provided with cylindrical end portions and annular sealing elements sealingly engaging the cylindrical portions and the bushing ends.

7. In a shackle mechanism connection between a vehicle frame and the eye of a spring, a pair of substantially parallel bolt elements having intermediate portions screw-threadedly rotatably connected respectively to the frame and to the eye, a pair of link elements rigidly connected at opposite ends to corresponding end portions of the bolt elements, a lubricant duct communicating with the threaded portion of one bolt, extending axially through the bolt and longitudinally of a link, and axially of the other bolt, and communicating with the threaded portion thereof, means for introducing lubricant into the duct, said threaded bolt elements provided with longitudinal grooves in the threads thereof.

8. In a spring shackle mechanism comprising an element carried by the vehicle frame, a pair of spaced shackle bolts and shackle links secured to the ends of the bolts and maintaining them in spaced parallel relation, one of said bolts making rotational bearing contact between the links with an encircling vehicle spring eye and the other making rotational bearing contact between the links with said frame carried element, a lubricant containing casing having a lubricant containing portion elevated relative to both of said shackle bolts, said bolts and at least one of said links having intercommunicating lubricant passages, and communicating at an uppermost portion with said casing whereby lubricant from the casing may be supplied by gravity from the casing through said passages to the bearing surfaces of both bolts, and a lubricant receiving nipple affixed to a lower part of the shackle mechanism and adapted to receive lubricant under pressure to communicate it to said passages at a point adjacent the lower bolt, whereby lubricant under pressure will fill said passages and the excess be supplied to said casing and displace air contained in the passages into the upper part of the casing.

9. In a spring shackle mechanism comprising an element carried by the vehicle frame, a pair of spaced shackle bolts and shackle links secured to the ends of the bolts and maintaining them in spaced parallel relation, one of said bolts making rotational bearing contact between the links with an encircling vehicle spring eye and the other making rotational bearing contact between the links with said frame carried element, a lubricant containing casing having a lubricant containing portion elevated relative to both of said shackle bolts, said bolts and at least one of said links having intercommunicating lubricant passages, and communicating at an uppermost portion with said casing whereby lubricant from the casing may be supplied by gravity from the casing through said passages to the bearing surfaces of both bolts, and a lubricant receiving nipple affixed to a lower part of the shackle mechanism and adapted to receive lubricant under pressure to communicate it to said passages at a point adjacent the lower bolt, whereby lubricant under pressure will fill said passages and the excess be supplied to said casing and displace air contained in the passages into the upper part of the casing, said casing having a wall disposed above the level of the upper bolt and provided with an opening to atmosphere in such portion whereby the upper level of lubricant in the casing is always maintained at atmospheric pressure.

10. In combination with a generally horizontally extending portion of a vehicle frame of angular cross-sectional form, in a spring shackle mechanism comprising an element carried by the vehicle frame, a pair of spaced shackle bolts and shackle links secured to the ends of the bolts and maintaining them in spaced parallel relation, one of said bolts making rotational bearing contact between the links with an encircling vehicle spring eye and the other making rotational bearing contact between the links with said frame carried element, a lubricant containing casing having a lubricant containing portion elevated relative to both of said shackle bolts, said bolts and at least one of said links having intercommunicating lubricant passages, and communicating at an uppermost portion with said casing whereby lubricant from the casing may be supplied by gravity from the casing through said passages to the bearing surfaces of both bolts, and a lubricant receiving nipple affixed to a lower part of the shackle mechanism and adapted to receive lubricant under pressure to communicate it to said passages at a point adjacent the lower bolt, whereby lubricant under pressure will fill said passages and the excess be supplied to said casing and displace air contained in the passages into the upper part of the casing, said frame carried element disposed within the angular frame and comprising an upstanding plate portion rigidly affixed to the frame and a tubular portion encircling the upper bolt said bolt being relatively rotatable thereon, said frame comprising a wall containing a perforation through which the upper bolt is projected.

11. In combination with a generally horizontally extending portion of a vehicle frame of angular cross-sectional form, in a spring shackle mechanism comprising an element carried by the vehicle frame, a pair of spaced shackle bolts and shackle links secured to the ends of the bolts and maintaining them in spaced parallel relation, one of said bolts making rotational bearing contact between the links with an encircling vehicle spring eye and the other making rotational bearing contact between the links with said frame carried element, a lubricant containing casing having a lubricant containing portion elevated relative to both of said shackle bolts, said bolts and at least one of said links having intercommunicating lubricant passages, and communicating at an uppermost portion with said casing whereby lubricant from the casing may be supplied by gravity from the casing through said passages to the bearing surfaces of both bolts, and a lubricant receiving nipple affixed to a lower part of the shackle mechanism and adapted to receive lubricant under pressure to communicate it to said passages at a point adjacent the lower bolt, whereby lubricant under pressure will fill said passages and the excess be supplied to said casing and displace air contained in the passages into the upper part of the casing, said frame carried element disposed within the angular frame and comprising an upstanding plate portion rigidly affixed to the frame and a tubular portion encircling the upper bolt said bolt being relatively rotatable thereon, said frame comprising a wall containing a perforation through which the upper bolt is projected, said casing comprising a cup-shaped element having its rim integrally secured to the upstanding wall of said frame carried element, and provided with a perforation in its end wall, the portions thereof at said perforation making lubricant sealing engagement with an outer surface of the tubular portion of said frame carried element, whereby said cup-shaped element forms two walls of said casing and said frame carried element forms the remaining walls thereof, said casing comprising an annular lubricant containing portion encircling the upper bolt.

12. A shackle mechanism comprising a shackle hanger having a central tubular hub providing interiorly disposed bearing surfaces and a lubricant casing surrounding said hub and having a lubricant containing portion disposed above the level of the upper portions of said interiorly disposed bearing surfaces, a pair of shackle links and a pair of shackle bolts, each joined to corresponding ends of said links, said links and bolts forming a quadrilateral structure, one of said bolts projected through said hanger hub and its outer surfaces disposed in rotational bearing contact with the said interiorly disposed surfaces of the hub, a relatively rotatable tubular mechanical element encircling the other of said bolts and disposed substantially below the level of said hub, said hub being laterally apertured and said upper bolt being longitudinally cored, at least one of said links having a longitudinally extending passage and said lower bolt being longitudinally cored and provided with a lateral passage leading from its cored interior to its bearing surfaces, all of the passages, apertures and cores forming a continuous passage for lubricant from the said casing descending by gravity therefrom to the bearing surfaces of both bolts and with respect to the lowermost bolt via the passage in said link, resiliently compressed packing means making pressure contact with the ends of said hub, and adjacent end portions of the uppermost bolt, and other resiliently compressed packing means making pressure contact with the ends of the mechanical element and the adjacent surfaces of the lowermost bolt, said packing means restraining flow of lubricant from the bearing surfaces of said bolts.

OSCAR U. ZERK.